United States Patent [19]

Tsuji et al.

[11] 4,230,323
[45] Oct. 28, 1980

[54] AUTOMATIC RECORD PLAYER

[75] Inventors: Sigeki Tsuji, Tenri; Hiromichi Shiozaki; Eiji Yamasaki, both of Nara, all of Japan

[73] Assignee: Sharp Kabushiki Kaisha, Osaka, Japan

[21] Appl. No.: 945,898

[22] Filed: Sep. 26, 1978

[51] Int. Cl.³ ............................................. G11B 17/06
[52] U.S. Cl. ........................ 274/9 RA; 179/100.4 D
[58] Field of Search ............ 179/100.4 D; 274/9 RA, 274/13, 14, 15 R, 23 R; 250/231 SE; 318/594

[56] References Cited

U.S. PATENT DOCUMENTS

| | | | |
|---|---|---|---|
| 2,952,464 | 9/1960 | Stimler | 274/23 R |
| 3,368,080 | 2/1968 | Nakagiri et al. | 274/15 |
| 3,530,447 | 9/1970 | Lambert | 179/100.4 D |
| 3,661,397 | 5/1972 | Worth et al. | 274/9 RA |
| 3,662,350 | 5/1970 | Chertok | 274/15 R |
| 3,689,079 | 9/1972 | Matsuda et al. | 274/9 RA |
| 3,721,882 | 3/1973 | Helms | 318/594 |
| 3,728,551 | 4/1973 | Culver et al. | 250/231 SE |
| 3,912,926 | 10/1975 | Coulbourn | 250/231 SE |
| 3,937,903 | 2/1976 | Osann | 179/100.4 D |
| 3,993,315 | 11/1976 | Hansen et al. | 274/23 A |
| 4,109,114 | 8/1978 | Baer et al. | 274/15 R |
| 4,135,086 | 1/1979 | Babu | 274/9 RA |
| 4,142,729 | 3/1979 | McLennan | 274/9 RA |

*Primary Examiner*—John W. Shepperd
*Attorney, Agent, or Firm*—Birch, Stewart, Kolasch & Birch

[57] ABSTRACT

A nonrecorded section detection sensor is driven to scan a disc surface to determine addresses of each nonrecorded portions provided between two adjacent tracks. A selection keyboard is provided for selecting a desired track or desired tracks to be played. A random access memory stores the addresses of the beginning portion and the ending portion of the selected track. A control means functions to locate a pickup cartridge at the address of the beginning portion of the selected track to perform the play operation. When the play operation is conducted to the address of the ending portion of the selected track, the pickup cartridge is driven to travel upward to terminate the play operation.

25 Claims, 22 Drawing Figures

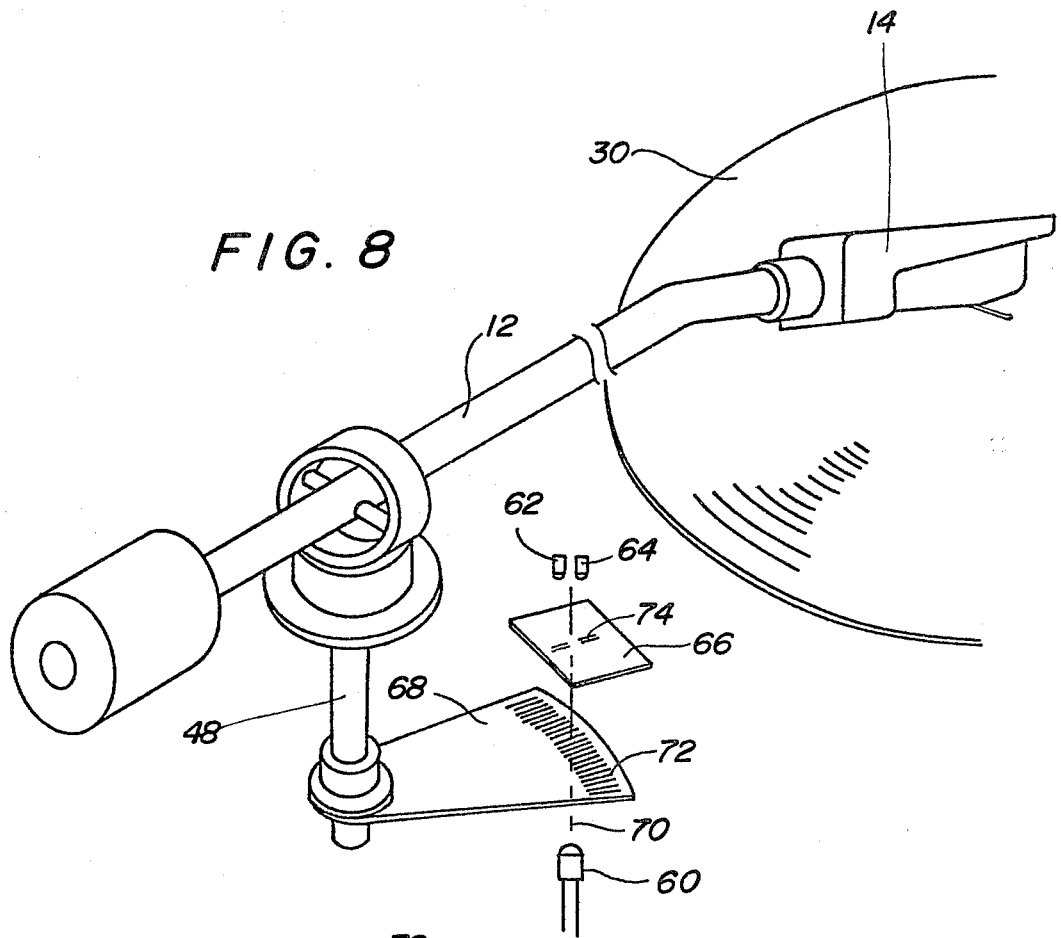
FIG. 8
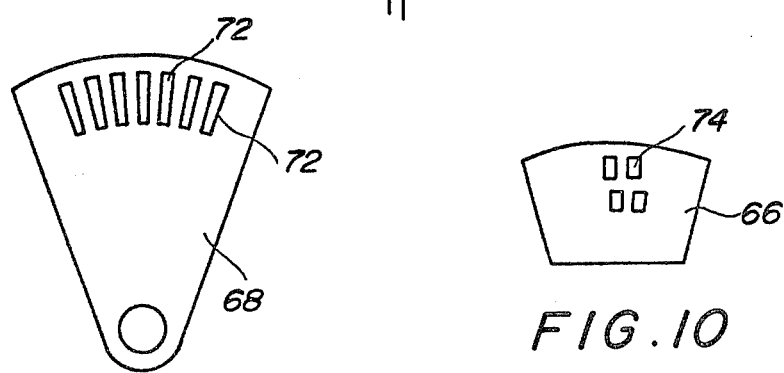
FIG. 9
FIG. 10

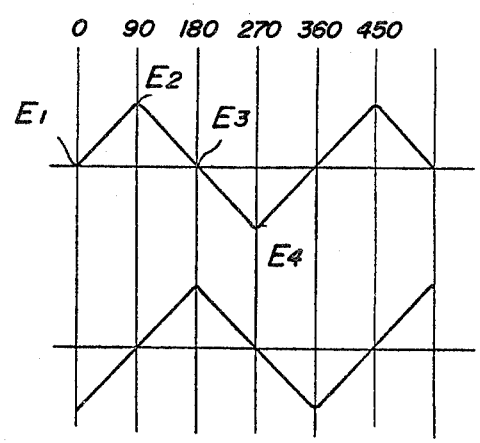
FIG.11(A)
FIG.11(B)
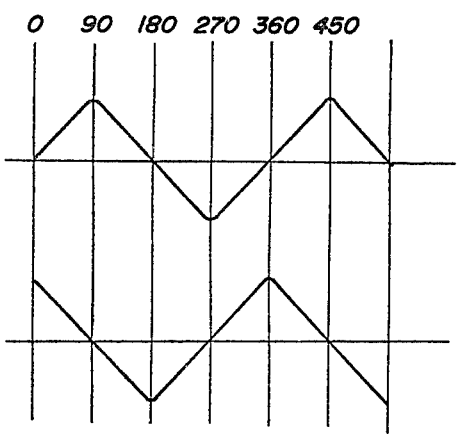
FIG.12(A)
FIG.12(B)
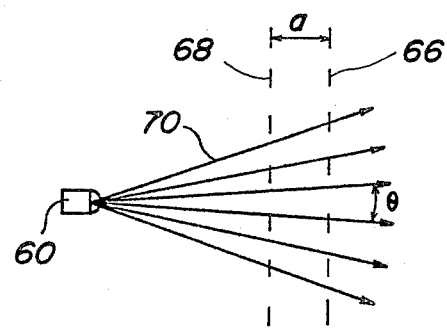
FIG.13
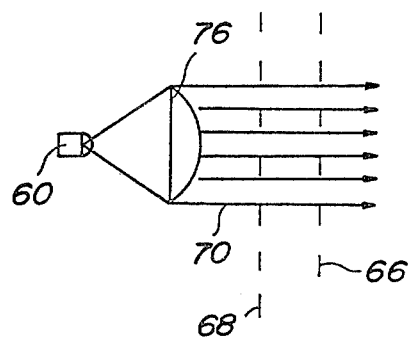
FIG.14
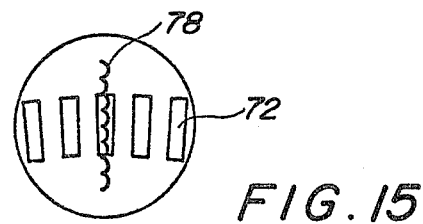
FIG.15

AUTOMATIC RECORD PLAYER

BACKGROUND AND SUMMARY OF THE INVENTION

The present invention relates to an automatic player which automatically plays a desired section on a disc.

An automatic record player has been developed, which responds to a nonrecorded section provided between two adjacent tracks recorded on a disc. However, the conventional automatic record player such as "Accutrac 4000" manufactured by AUDIO DYNAMICS CORPORATION responds only to the nonrecorded section. Therefore, the conventional system does not work well on a disc which does not have a nonrecorded section, such as a classic music disc or a speech recorded disc. Moreover, the operation of the conventional system is not stable, because the conventional system does not have a detection system for detecting the location of a tonearm head.

Accordingly, an object of the present invention is to provide an automatic player for automatically playing a desired section on a disc.

Another object of the present invention is to provide an automatic record player which detects the location of a tonearm on a disc.

Still another object of the present invention is to provide a control system for an automatic player for storing an address of a nonrecorded section provided between two adjacent tracks recorded on a disc.

Yet another object of the present invention is to provide a control system for an automatic player for playing a desired section preselected through the use of addresses on a disc.

A further object of the present invention is to provide an automatic record player of stable operation.

Other objects and further scope of applicability of the present invention will become apparent from the detailed description give hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention is applicable to a record player and a video disc player.

To achieve the above objects, pursuant to an embodiment of the present invention, a scanning means is provided for determining addresses of each portion on a disc. A selection keyboard is provided for selecting a desired track or desired tracks to be played. A storing means stores the addresses of the beginning portion and the ending portion of the selected track. A control means functions to locate a pickup cartridge at the address of the beginning portion of the selected track to play the selected track. When the play operation is conducted to the address of the ending portion of the selected track, and then the system is shifted to the following operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 8 is a perspective view of the tonearm rotation angle detector of FIG. 7;

FIG. 9 is a plan view of a rotatable slit plate employed in the tonearm rotation angle detector of FIG. 8;

FIG. 10 is a plan view of an stationary slit plate employed in the tonearm rotation angle detector of FIG. 8;

FIGS. 11(A) and 11(B) are charts showing waveforms of output signals of light responsive elements employed in the tonearm rotation angle detector of FIG. 8, when the tonearm rotates inward;

FIGS. 12(A) and 12(B) are charts showing waveforms of output signals of the light responsive elements when the tonearm rotates outward;

FIG. 13 is a schematic cross sectional view showing relationships between a light emitting element and slit plates employed in an embodiment of the tonearm rotation angle detector of FIG. 8;

FIG. 14 is a schematic cross sectional view showing relationships between a light emitting element and slit plates employed in another embodiment of the tonearm rotation angle detector of FIG. 8;

FIG. 15 is a schematic plan view showing relationships between a light emitting element and a slit plate employed in still another embodiment of the tonearm rotation angle detector of FIG. 8;

DESCRIPTION OF THE PREFERRED EMBODIMENTS

Figure 1:
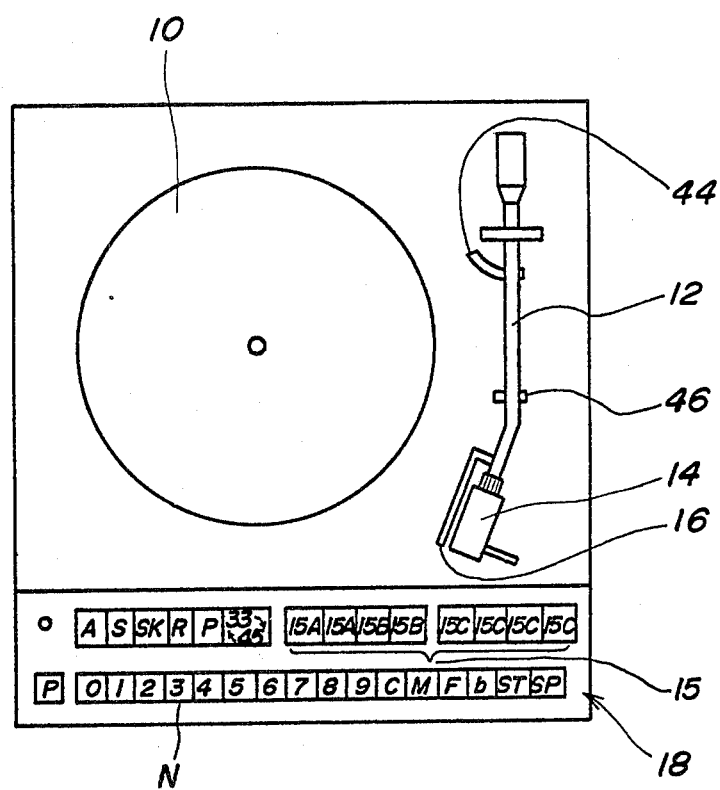
FIG. 1 is a plan view of an embodiment of an automatic record player of the present invention.

FIG. 1 shows an embodiment of an automatic record player of the present invention.

The automatic record player mainly comprises a turntable 10, a tonearm 12, a pickup cartridge 14, a nonrecorded section detection sensor 16 and a control panel 18. The nonrecorded section detection sensor 16 is carried by the tonearm 12 to scan a disc mounted on the turntable 10, whereby the nonrecorded section is opto-electrically detected. More specifically, when the nonrecorded section detection sensor 16 reaches the nonrecorded section provided between two adjacent tracks, a nonrecorded section detection signal $S_1$ is developed from a control circuit. The nonrecorded section detection sensor 16 is not necessarily mounted on the tonearm 12, but can be mounted on a carriage separate from the tonearm 12.

Figure 2:
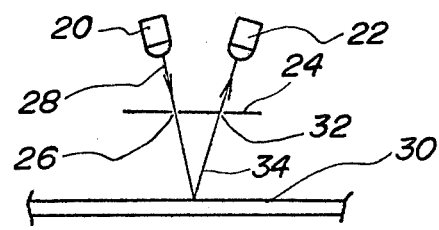
FIG. 2 is a schematic cross sectional view of an embodiment of a nonrecorded section detection sensor employed in the automatic record player of FIG. 1.

FIG. 2 schematically shows an embodiment of the nonrecorded section detection sensor 16.

The nonrecorded section detection sensor 16 mainly comprises a light emitting element 20, a light responsive element 22 and a slit plate 24. The slit plate 24 includes a first slit 26 for introducing a light beam 28 emitted from the light emitting element 20 toward a disc surface 30, and a second slit 32 for introducing a light beam 34 reflected at the disc surface 30 toward the light responsive element 22.

Figure 3:
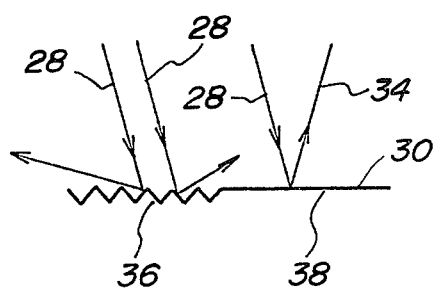
FIG. 3 is a sectional view for explaining operation of the nonrecorded section detection sensor of FIG. 2.

When the nonrecorded section detection sensor 16 scans a recorded portion 36 as shown in the left side of FIG. 3, the light beam 28 is scattered at the disc surface 30 and, therefore, the light responsive element 22 does not receive the light beam 34. Contrarily, when the nonrecorded section detection sensor 16 scans a nonrecorded portion 38 as shown in the right side of FIG. 3, the light beam 28 is reflected at the disc surface 30 and, therefore, the light responsive element 22 receives the light beam 34.

Figure 4:
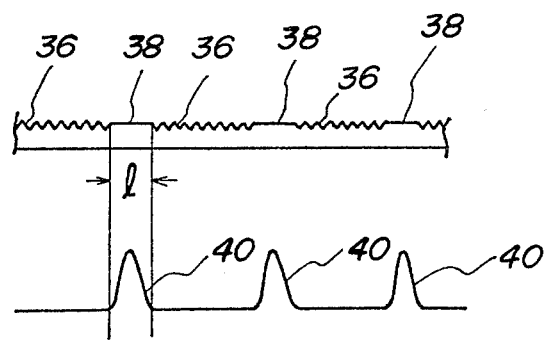
FIG. 4 is a chart showing an output signal of the nonrecorded section detection sensor of FIG. 2.

That is, the light responsive element 22 develops an output signal 40, or the nonrecorded section detection signal $S_1$ each time when the nonrecorded section detection sensor 16 reaches the nonrecorded portion 38 as shown in FIG. 4. Generally, the nonrecorded portion 38 has a width l ranging from 0.2 mm to 0.6 mm.

Figure 5:
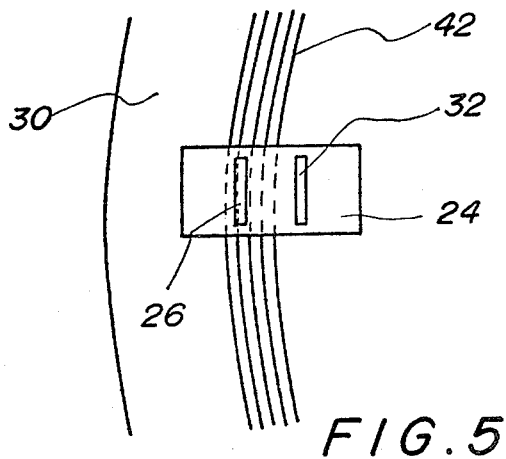
FIG. 5 is a plan view of a slit plate employed in the nonrecorded section detection sensor of FIG. 2.

To ensure the above-mentioned detection, the first and second slits 26 and 32 are formed in the slit plate 24 so that the slits 26 and 32 parallel grooves 42 formed in the disc surface 30 as shown in FIG. 5.

Figure 6:
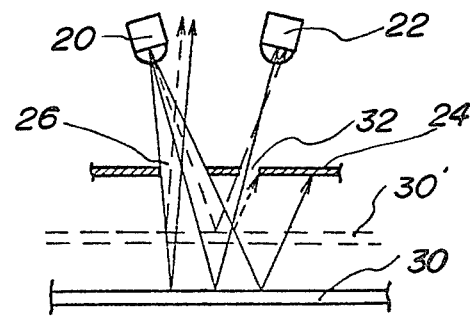
FIG. 6 is a schematic cross sectional view of another embodiment of a nonrecorded section detection sensor employed in the automatic record player of FIG. 1.

FIG. 6 schematically shows another embodiment of the nonrecorded section detection sensor 16. Like elements corresponding to those of FIG. 2 are indicated by like numerals.

In the embodiment of FIG. 6, the first slit 26 is widened in order to compensate for variation of height of the disc surface 30 and the nonrecorded section detection sensor 16. More specifically, the light responsive element 22 receives the light beam reflected at the disc surface 30, even when the disc surface 30 is positioned at the higher position 30'.

During the above-mentioned detection operation, the stylus is kept away from the disc surface when the nonrecorded section detection sensor 16 is mounted on the tonearm 12. The scanning operation is conducted through the use of a suitable drive mechanism including a motor.

The automatic record player further comprises an arm lifter 44 and an arm rest 46 as is well known in the art. The location of the cartridge 14 or a rotation angle of the tonearm 12 is detected through the use of a rotation angle detector associated with a tonearm shaft which is selectively connected to a drive mechanism for shifting the tonearm 12.

Figure 7:
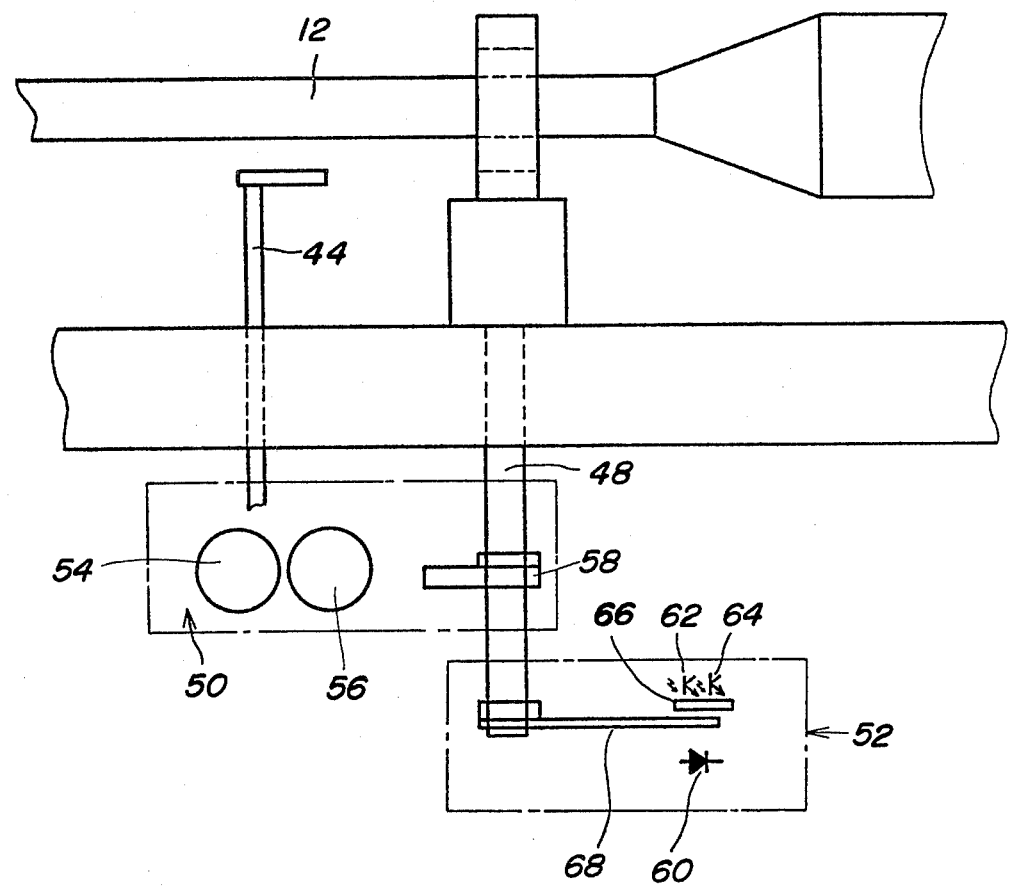
FIG. 7 is a schematic cross sectional view of an embodiment of a tonearm rotation angle detector and a drive mechanism for shifting a tonearm employed in the automatic record player of FIG. 1.

FIG. 7 schematically shows the rotation angle detector and the drive mechanism for shifting the tonearm 12. Like elements corresponding to those of FIG. 1 are indicated by like numerals.

The tonearm 12 is rotatably supported by a tonearm rotation shaft 48, to which a drive mechanism 50 for shifting the tonearm 12 and a rotation angle detector 52 is associated. The drive mechanism 50 comprises two motors 54 and 56. The motor 54 is associated with a transfer mechanism for driving the arm lifter 44 downward and upward. A detection mechanism is associated with the arm lifter 44 so that an upward signal $S_4$ is developed when the arm lifter 44 is driven to travel upward, a downward signal $S_5$ is developed when the arm lifter 44 is drive to travel downward, and a rest signal $S_6$ is developed when the tonearm 12 is held stationary on the arm rest 46. The operations of the motors 54 and 56 are controlled by control signals derived from a control circuit.

The motor 56 is connected to the tonearm rotation shaft 48 through a clutch mechanism 58. The clutch mechanism 58 is ON when the tonearm 12 is desired to be positioned at the desired address on the disc through the use of revolution of the motor 56, and the clutch mechanism 58 is OFF when the play operation is conducted at which the tonearm 12 follows the grooves formed on the disc surface.

The rotation angle detector 52 mainly comprises a light emitting element 60, two light responsive elements 62 and 64, a stationary slit plate 66, and a rotatable slit plate 68 fixed to the tonearm rotation shaft 48. The rotatable slit plate 68 rotates in unison with the rotation of the tonearm rotation shaft 48, whereby the light amount reaching the light responsive elements 62 and 64 is varied in response to the rotation of the tonearm 12. Output signals of the light responsive elements 62 and 64 are used to develop an address signal $S_2$ for indicating the location of the cartridge, and a direction signal $S_3$ for indicating whether the tonearm 12 is rotating inward or outward.

FIG. 8 shows the rotation angle detector 52. Like elements corresponding to those of FIG. 7 are indicated by like numerals.

A light beam 70 emitted from the light emitting element 60 passes through slits 72 formed in the rotatable slit plate 68 and slits 74 formed in the stationary slit plate 66 and, thereafter, reaches the light responsive elements 62 and 64. The light amount reaching the light responsive elements 62 and 64 is variable in response to rotation of the rotatable slit plate 68.

FIG. 9 shows the slits 72 formed in the rotatable slit plate 68, and FIG. 10 shows the slits 74 formed in the stationary slit plate 66.

When the tonearm 12 rotates inward, or in the clockwise direction as seen at FIG. 1, the light responsive elements 62 and 64 develop output signals as shown in FIGS. 11(A) and 11(B), respectively. That is, the output signal of the light responsive element 64 is delayed by 90° from that of the light responsive element 62. Contrarily, when the tonearm 12 rotates outard, or in the counter-clockwise direction as seen at FIG. 1, the light responsive elements 62 and 64 develop output signals as shown in FIGS. 12(A) and 12(B), respectively. That is, the output signal of the light responsive element 64 is delayed by 270° from that of the light responsive element 62.

The output signal of the light responsive element 62 is applied to a level detector, which develops a pulse signal each time the output signal of the light responsive element 62 takes values corresponding to 0° ($E_1$), 90° ($E_2$), 180° ($E_3$), and 270° ($E_4$) as shown in FIG. 11(A). The pulse signal derived from the level detector is applied to a counter to determine the address of the cartridge.

The above-mentioned two output signals of the light responsive elements 62 and 64 are applied to a phase determination circuit for determining whether the tonearm is rotating inward or outward. An output signal of the phase determination circuit functions to control so that the counter conducts the up-count operation when the tonearm is rotating inward, and the down-count operation when the tonearm is rotating outward.

When the stationary slit plate 66 is separated from the rotatable slit plate 68 by a distance a, the width of the slits 74 formed in the stationary slit plate 66 is preferably tan $\theta \times$ a times that of the slits 72 formed in the rotatable slit plate 68, because the light beam 70 emitted from the light emitting element 60 is not parallel as shown in FIG. 13.

To minimize the erroneous detection, a lens 76 is positioned in front of the light emitting element 60 as shown in FIG. 14, thereby providing parallel light beams.

In case where the light emitting element 60 comprises a lamp including a filament 78, the lamp is preferably disposed in a direction wherein the filament 78 parallels the slits 72 formed in the rotatable slit plate 68 as shown in FIG. 15.

The control panel 18 includes numeral keys N for introducing a desired track number or an address to be played, various control selection keys, and a digital display means 15. The digital display means 15 comprises a program number display 15A for indicating the program number, a track number display 15B for indicating a selected track number, and an address display 15C for indicating a selected address.

Figure 16:
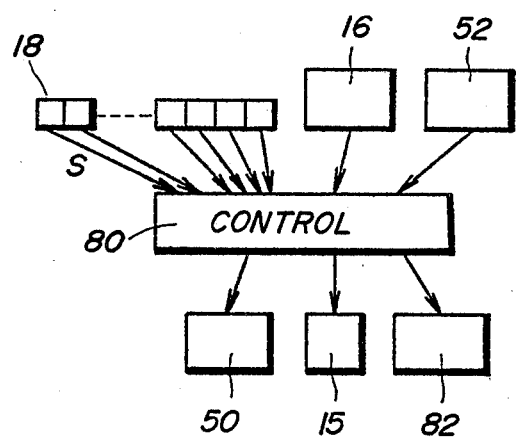
FIG. 16 is a schematic block diagram of the automatic record player of FIG. 1.

FIG. 16 schematically shows a block diagram of the automatic record player of the present invention.

Instruction signals S derived from the control panel 18 are introduced into a control circuit 80. The control circuit 80 also receives signals $S_1$ through $S_6$ derived from the nonrecorded section detection sensor 16 and the tonearm rotation angle detector 52. The control circuit 80 functions to control operations of the tonearm drive mechanism 50, the digital display means 15, and a turntable drive motor 82.

Figure 17:
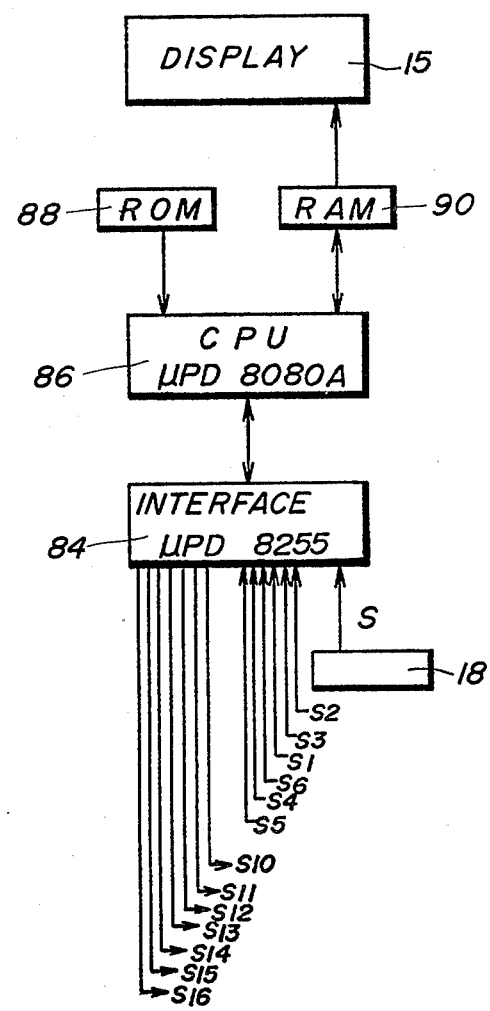
FIG. 17 is a schematic block diagram of a control circuit employed in the automatic record player of FIG. 16.

FIG. 17 schematically shows the control circuit 80.

The control circuit 80 mainly comprises an interface 84 for introducing the instruction signals S derived from the control panel 18, and signals $S_1$ through $S_6$ derived from the nonrecorded section detection sensor 16 and the tonearm rotation angle detector 52, a central processor unit 86, a read only memory 88, and a random access memory 90. The interface 84 is made of "$\mu$PD 8255" manufactured by Nippon Electric Company, Ltd., and the central processor unit 86 is made of "$\mu$PD 8080A" manufactured by Nippon Electric Company, Ltd.

The interface 84 develops a tonearm inward fast drive signal $S_{10}$, a tonearm inward slow drive signal $S_{11}$, a tonearm outward fast drive signal $S_{12}$, a tonearm outward slow drive signal $S_{13}$, an arm lifter control signal $S_{14}$, a turntable drive control signal $S_{15}$, and a display control signal $S_{16}$.

When the tonearm 12 is positioned on the arm rest 46, the address of the cartridge 14 is "0000". When the tonearm 12 is located at the innermost position, the address of the cartridge 14 is "1000". The control circuit 80 determines the address of the cartridge 14 through the use of the address signal $S_2$ and the direction signal $S_3$ derived from the tonearm rotation angle detector 52.

Figure 18:
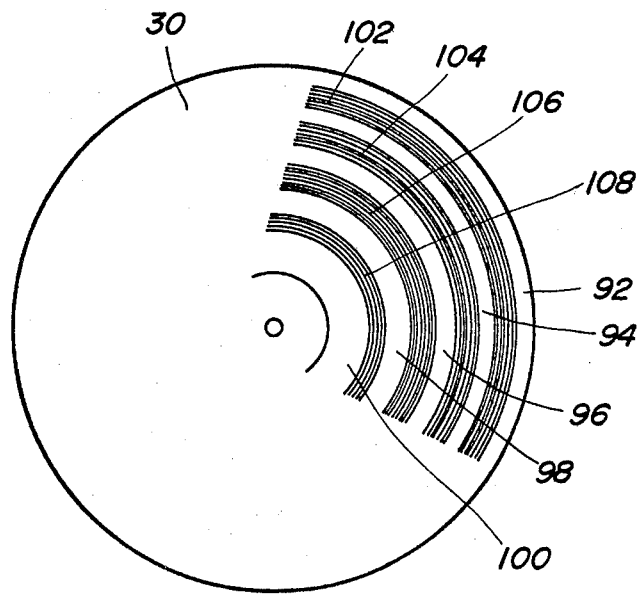
FIG. 18 is a plan view of a disc.

FIG. 18 shows a disc, which includes nonrecorded sections 92, 94, 96, 98 and 100, a first track 102, a second track 104, a third track 106, and a fourth track 108.

Figure 19:
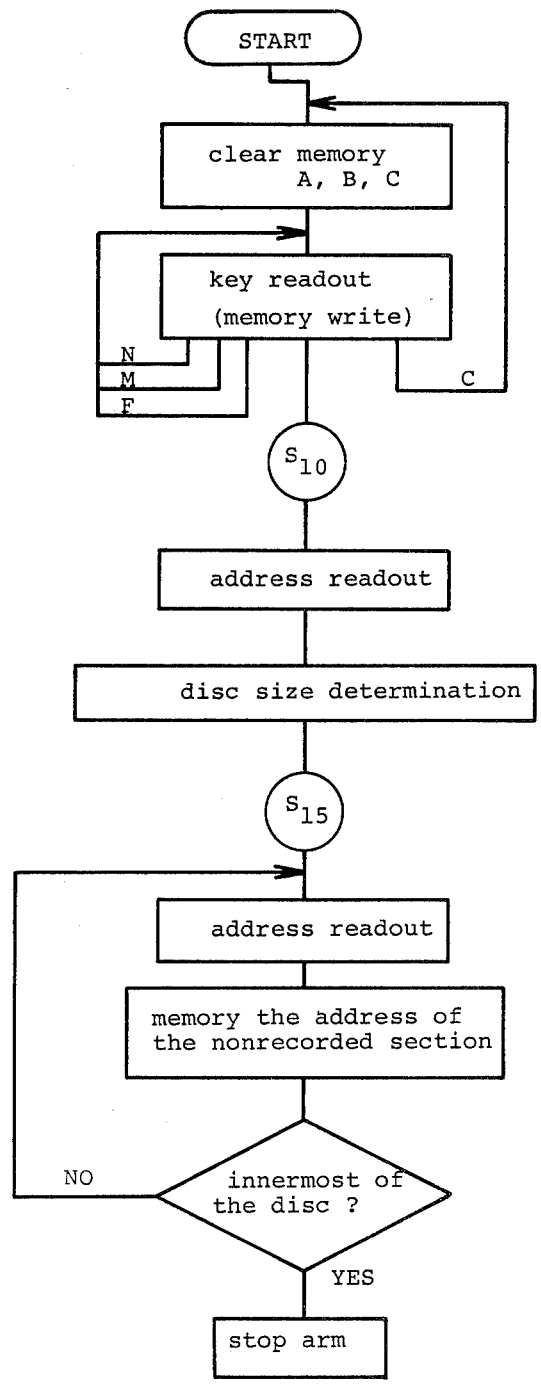
FIG. 19 is a flow chart showing one mode of operation of the automatic record player of FIG. 1.
Figure 20:
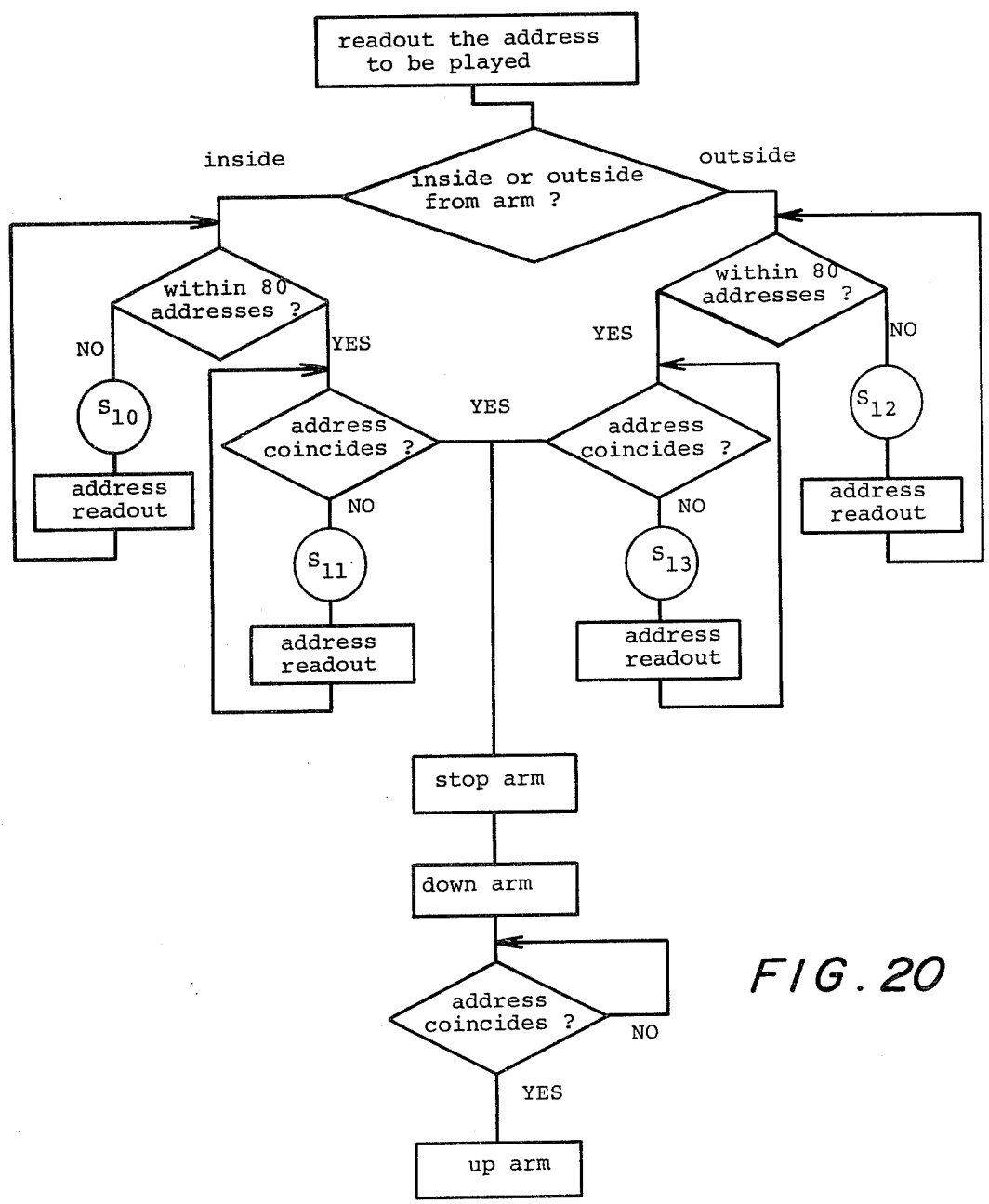
FIG. 20 is a flow chart showing another mode of operation of the automatic record player of FIG. 1.

Operation of the automatic record player of FIG. 1 will be described with reference to FIGS. 19 and 20.

The control panel 18 includes the numeral keys N, a memory clear key C, a track selection key M for selecting a desired track to be played, an address selection key F for selecting a desired address to be played, a start key ST for initiating the operation, a stop key SP for stopping the turntable and returning the tonearm to the arm rest, an all key A for conducting a conventional play operation wherein all tracks are played, a slider key S for manually placing the tonearm at a desired position, a skip key SK for skipping one track, a repeat key R for repeating the play operation of the track now played, a pause key P, and a play speed selection key

for manually selecting turntable rotation speed.

When the start key ST is operated, the read only memory 88 develops a signal for clearing memories A, B and C included within the random access memory 90. The central processor unit 86 reads out a key signal derived from the control panel 18 through the interface 84. When the numeral keys N are operated and then the address selection key F is operated, the numeral information is introduced into the memory C of the random access memory 90 and stored therein. At this moment, the thus introduced numeral information is displayed on the address display 15C. When the numeral keys N are operated and then the track selection key M is operated, the selected track number is stored in the memory A of the random access memory 90, and the selected track number is displayed on the track number display 15B. When the first program is conducted, the program number display 15A indicates "01", and when the third program is conducted, the program number display 15A indicates "03".

The tonearm inward fast drive signal $S_{10}$ is developed from the interface 84 to scan the disc for detecting the nonrecorded section. The tonearm rotation angle detector 52 develops the address signals $S_2$ and the direction signal $S_3$, and the nonrecorded section detection sensor 16 develops the nonrecorded section detection signal $S_1$ each time when the nonrecorded section is detected. At a time when the first nonrecorded section detection signal $S_1$ is developed in response to the first nonrecorded section 92 (see FIG. 18), the address of the first nonrecorded section 92 is checked to determine the disc size. In case where the disc size is 17 cm, the turntable drive control signal $S_{15}$ is developed to select the "45" speed of the turntable. Contrarily, when the disc size is 30 cm, the turntable drive control signal $S_{15}$ is developed to select the "33" speed of the turntable.

Thereafter, each time when the nonrecorded section detection signal $S_1$ is developed, the address of the nonrecorded section is stored in the memory B of the random access memory 90. When the scan operation is conducted to the innermost position of the disc, or when the address of the tonearm reaches "1000", the central processor unit 86 functions to terminate the development of the tonearm inward fast drive signal $S_{10}$. In this way, the address scan operation is completed.

Thereafter, the initial address and the last address of a track selected and stored in the memory A of the random access memory 90 are read out from the memory B of the random access memory 90, and introduced into the memory C and stored therein in the order of selection. After completion of this transfer operation, the operation is shifted to the operation shown in FIG. 20.

The initial address of the selected track to be played, which is stored in the memory C of the random access memory 90, is read out and introduced into the central processor unit 86. In the case where the thus read out address is greater than that of the tonearm now positioned and when the difference is greater than "80", the tonearm inward fast drive signal $S_{10}$ is developed. When the difference between the address of the tonearm and the selected value becomes smaller than "80", the tonearm inward slow drive signal $S_{11}$ is developed.

In case where the address stored in the memory C is smaller than that of the tonearm and when the difference is greater than "80", the tonearm outward fast drive signal $S_{12}$ is developed. When the difference between the tonearm address and the stored address becomes smaller than "80", the tonearm outward slow drive signal $S_{13}$ is developed. In this way, when the tonearm address becomes identical with the stored address, the rotation of the tonearm is terminated and then the arm lifter control signal $S_{14}$ is developed to down the tonearm, thereby performing the play operation from the selected address.

The memory C stores the last address of the selected track. The thus stored address is introduced into the central processor unit 86 and compared with the tonearm address while the play operation is conducted. When the play operation is conducted to the last address of the selected track, the arm lifter control signal $S_{14}$ is developed to up the tonearm. In this way, play operation of one selected track is completed.

The above-mentioned operation is repeated to complete every play operation of selected tracks. When the operation is conducted to the program where the memory C does not have any information, the central processor unit 86 develops the tonearm outward fast drive signal $S_{12}$ through the interface 84. When the tonearm 12 is returned to the arm rest 46, the rest signal $S_6$ is introduced into the central processor unit 86. Therefore, the central processor unit 86 develops the arm lifter control signal $S_{14}$ to down the tonearm onto the arm rest 46.

EXAMPLE I (Track Selection)

Operator desires to listen to the third track once and then the fifth track twice.

The numeral key "3" is operated and then the track selection key M is operated. The program number display 15A indicates "01", and the track number display 15B indicates "03". The information "3" is introduced into the memory A of the random access memory 90 and stored therein at the first program position. Thereafter, the numeral key "5" and the track selection key M are operated. The program number display 15A indicates "02", and the track number display 15B indicates "05". The information "5" is introduced into the second program position of the memory A of the random access memory 90. Then, the numeral key "5" and the track selection key M are again operated to introduce the information "5" into the third program position of the memory A of the random access memory 90. The program number display 15A indicates "03", and the track number display 15B indicates "05".

After completion of the program set, when the start key St is operated, the program number display 15A indicates "01" and the track number display 15B indicates "03". The arm lifter 44 is driven to travel upward, and the tonearm is driven to rotate inward by the tonearm inward fast drive signal $S_{10}$. During the scanning of the tonearm to the innermost position of the disc, the nonrecorded section detection sensor 16 develops the nonrecorded section detection signal $S_1$ and the tonearm rotation angle detector 52 develops the address signal $S_2$ and the direction signal $S_3$. The disc size is checked and the turntable is driven to rotate at a predetermined velocity. The address of the each nonrecorded section is detected and stored in the memory section B of the random access memory 90.

After completion of the scanning operation, the central processor unit 86 functions to read out the numeral information "3" stored in the first program position of the memory section A of the random access memory 90, and read out the initial address of the third track stored in the memory section B of the random access memory 90. That is, the initial address of the third track is the address of the third nonrecorded section, for example, "325". The thus read out information "325" is introduced into the initial address section of the first program position of the memory section C of the random access memory 90. In the same way, the last address of the third track or the address of the fourth nonrecorded section, for example, "388" is introduced into the last address section of the first program position of the memory section C of the random access memory 90.

The above-mentioned operation is repeated to set the program in the memory section C of the random access memory 90. More specifically, the address of the fifth nonrecorded section is introduced into the initial address memory section of the second program of the memory C, and the address of the sixth nonrecorded section is introduced in to the last address memory section of the second program of the memory C. The addresses of the fifth nonrecorded section and the sixth nonrecorded section are also introduced into the initial address memory section and the last address memory section of the third program position of the memory section C of the random access memory 90, respectively. No information is introduced into the fourth program position of the memory section C of the random access memory 90.

Thereafter, the central processor unit 86 functions to compare the address of the tonearm with the initial address of the first program stored in the memory section C of the random access memory 90. Since the tonearm is held stationary at the innermost position of the disc after completion of the scanning operation, the address of the tonearm is "1000". The address of the initial position of the first program is "325" and, therefore, the tonearm outward fast drive signal $S_{12}$ is developed. The tonearm is driven to rotate in the counterclockwise direction, and when the tonearm reaches the address "405" which is greater than the address "325" by "80", the tonearm outward slow drive signal $S_{13}$ is developed. When the tonearm reaches the address "325", the rotation of the tonearm is stopped and the arm lifter 44 is driven to travel downward to make the stylus contact with the disc. That is, the third track is played from the initial position.

The stylus follows the grooves formed on the disc surface and, therefore, the tonearm gradually rotates in the clockwise direction. The central processor unit 86 functions to compare the tonearm address with the address of the last position of the third track, namely, "388" while the play operation is performed. When the tonearm reaches the fourth nonrecorded section, the arm lifter 44 is driven to travel upward to separate the stylus from the disc surface.

Then, the operation is advanced to the second program. The program number display 15A indicates "02", and the track number display 15B indicates "05". The tonearm inward fast drive signal $S_{10}$ is developed, and then the tonearm inward slow drive signal $S_{11}$ is developed to stop the tonearm at the initial address of the fifth track. Thereafter, the arm lifter 44 is driven to travel downward to play the fifth track.

When the play operation of the fifth track is completed, that is, when the tonearm reaches the sixth nonrecorded section, the tonearm is lifted up. The program number display 15A indicates "03", and the track number display 15B indicates "05". The tonearm is driven to travel in the counter-clockwise direction to reach the address of the initial position of the fifth track. The fifth track is again played, and the tonearm is lifted up after completion of the play operation of the fifth track. The fourth program position does not have any information and, therefore, the tonearm is returned to the arm rest 46 and the turntable drive is terminated. The address display 15C indicates the now played address when the play operation is conducted.

EXAMPLE II (Address Selection)

Operator desires to listen to a section from the address "500" to "600", and then another section from the address "700" to "800".

The numeral keys "5", "0", "0" and the address selection key F are sequentially operated. The program number display 15A indicates "01", the track number display 15B indicates "F", and the address display 15C indicates "500". The information "500" is introduced into the initial address memory portion of the first program in the memory section C of the random access memory 90. Then, the numeral keys "6", "0", "0" and the address selection key F are sequentially operated to introduce information "600" into the last address memory portion of the first program in the memory section C of the random access memory 90. The program number display 15A indicates "01", the track number display 15B indicates "F", and the address display 15C indicates "600".

Thereafter, the numeral keys "7", "0", "0" and the address selection key F are sequentially operated to introduce information "700" into the initial address memory portion of the second program in the memory section C of the random access memory 90. The program number display 15A indicates "02", the track number display 15B indicates "F", and the address display 15C indicates "700". Then, the numeral keys "8", "0", "0" and the address selection key F are sequentially operated to introduce information "800" into the last address memory portion of the second program in the memory section C of the random access memory 90. The program number display 15A indicates "02", the track number display 15B indicates "F", and the address display 15C indicates "800".

When the start key ST is operated, the program number display 15A indicates "01", and the track number display 15B and the address display 15C display nothing. The arm lifter 44 is driven to travel upward, and the tonearm is driven to rotate in the clock wise direction by the tonearm inward fast drive signal $S_{10}$ toward the innermost position of the disc. When the tonearm reaches the innermost position, the central processor unit 86 functions to read out the information "500" stored in the initial address memory section of the first program of the memory C. The following operation is similar to that of the EXAMPLE I.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An automatic player comprising:
   support means for supporting a disc;
   disc drive means for rotating said disc on said support means;
   pickup means for performing play operation;
   pickup means drive means for shifting said pickup means to a desired address on said disc;
   pickup means position detecting means for producing a signal indicative of an address of said pickup means on said disc;
   input means for introducing a preselected address to be played into the automatic player;
   storing means for storing said preselected address;
   comparing means for comparing said preselected address stored in said storing means with the signal produced by said pickup means position detecting means and providing an output signal upon coincidence thereof;
   control means for activating said pickup means drive means in response to said output signal of said comparing means so that said pickup means is positioned at said preselected address;
   non-recorded section detection means connected to said pickup means, for detecting a non-recorded section formed between two adjacent tracks recorded on said disc;
   converting means for calculating an address of said non-recorded section using the signal produced by said pickup means position detecting means and the signal transmitted by said non-recorded section detection means and transmitting said address to said storing means for storage therein; and
   further input means for selecting at least one desired track to be played.

2. The automatic player of claim 1, wherein said nonrecorded section detection means comprise:
   a light emitting element;
   a light responsive element; and
   a slit plate including a first slit for introducing a light beam developed from said light emitting element toward said disc, and a second slit for introducing a light beam introduced through said first slit and reflected at said disc toward said light responsive element.

3. The automatic player of claim 1, wherein said first and second slits are formed to parallel the rotation of said disc.

4. The automatic player of claim 1, wherein said first slit is wider than said second slit.

5. The automatic player of claim 1, 2, 3 or 4 wherein said pickup means are mounted on an arm supported by a shaft, and said pickup means drive means function to rotate said shaft.

6. The automatic player of claim 5, which further comprises detection means for detecting rotation angle of said shaft, and wherein an output signal of said detection means is applied to said pickup means drive means as a signal indicating the address of said pickup means.

7. The automatic player of claim 6, wherein said detection means comprise:
a light emitting element;
at least one light responsive element;
a stationary slit plate disposed between said light emitting element and said light responsive element; and
a rotatable slit plate disposed between said light emitting element and said stationary slit plate, said rotatable slit plate being fixed to said shaft so that the rotatable slit plate rotates in unison with rotation of said shaft.

8. The automatic player of claim 7, wherein a first and a second light responsive elements are provided, and wherein said stationary slit plate includes at least two slits formed therein, whereby an output signal of said first light responsive element is delayed by a predetermined phase with respect to that of said second light responsive element when said shaft is driven to rotate in a predetermined direction.

9. An automatic record player comprising:
a turntable for supporting a disc;
turntable drive means for rotating said turntable;
pickup cartridge means carried by a tonearm;
tonearm drive means for shifting said pickup cartridge means to a desired address on said disc;
pickup cartridge means position detecting means for producing a signal indicative of an address of said pickup cartridge means on said disc;
input means for introducing a preselected address to be played into the automatic record player;
storage means for storing said preselected address;
comparing means for comparing said preselected address stored in said storing means with the the signal produced by said pickup cartridge means position detecting means and providing an output signal upon coincidence thereof;
control means for activating said tonearm drive means in response to said output signal of said comparing means so that said pickup cartridge means is positioned at said preselected address;
non-recorded section detection means connected to said pickup means, for detecting a non-recorded section formed between two adjacent tracks recorded on said disc;
converting means fo calculating an address of said non-recorded section using the address detected by said pickup means and the signal transmitted by said non-recorded section detection means and transmitting said address to said storing means for storage therein; and
further input means for selecting at least one desired track to be played.

10. The automatic record player of claim 9, wherein said tonearm drive means are constructed so that the tonearm is driven to rotate at two different speeds.

11. The automatic record player of claim 10, wherein said control means include speed determination means for driving said tonearm at a fast speed when a difference between the preselected address and the address detected by said pickup cartridge means position detecting means is greater than a preselected value, and for driving said tonearm at a slow speed when the difference between the preselected address and the address detected by said pickup cartridge means position detecting means is smaller than said predetermined value.

12. The automatic record player of claim 9, which further comprises a disc size determination means for determining a size of disc supported by said turntable.

13. The automatic record player of claim 12, which further comprises turntable drive speed determination means for automatically selecting a desired drive speed of said turntable in response to an output signal of said disc size determination means.

14. The automatic record player of claim 9, wherein said nonrecorded section detection means are mounted on said tonearm adjacent to said pickup cartridge means.

15. An automatic player comprising:
support means for supporting a disc;
disc drive means for rotating said disc on said support means;
pickup means for performing play operation at a given current address on said disc;
detecting means for producing a signal indicative of a current address of said pickup means on said disc and for determining the direction of movement of said pickup means relative to the disc and producing an output representative of said current address and said direction;
pickup means drive means for shifting said pickup means to a desired address from said current address on said disc;
input means for introducing a preselected address to be played into the automatic player;
storing means for storing said preselected address;
comparing means for comparing said preslected address stored in said storing means with the signal indicative of the current address produced by said pickup means position detecting means;
control means for activating said pickup means drive means in response to an output signal of said comparing means and the output of said detecting means so that said pickup means is positioned at said preselected address;
nonrecorded section detection means connected to said pickup means for detecting a nonrecorded section formed between two adjacent tracks recorded on said disc;
converting means for calculating an address of said non-recorded section using the address produced by said detecting means and the signal transmitted by said nonrecorded section detecting means and transmitting said address to said storing means for storage therein; and
further input means for selecting at least one desired track to be played.

16. The automatic player of claim 15, wherein said nonrecorded section detection means comprises:
a light emitting element;
a light responsive element; and
a slit plate including a first slit for introducing a light beam developed from said light emitting element toward said disc, and a second slit for introducing a light beam introduced through said first slit and reflected at said disc toward said light responsive element.

17. The automatic player of claim 16, wherein said first and second slits are formed to parallel the rotation of said disc.

18. The automatic player of claim 16, wherein said first slit is wider than said second slit.

19. The automatic player of claim 15, 16, 17 or 18 wherein said pickup means are mounted on an arm supported by a shaft, and said pickup means drive means functions to rotate said shaft.

20. The automatic player of claim 19, wherein said signal produced by said detection means is indicative of the rotation angle of said shaft.

21. The automatic player of claim 20, wherein said detection means comprise:
a light emitting element;
at least one light responsive element;
a stationary slit plate disposed between said light emitting element and said light responsive element; and
a rotatable slit plate disposed between said light emitting element and said stationary slit plate, said rotatable slit plate being fixed to said shaft so that the rotatable slit plate rotates in unison with rotation of said shaft.

22. The automatic player of claim 21, wherein a first and a second light responsive elements are provided, and wherein said stationary slit plate includes at least two slits formed therein, wherein an output signal of said first light responsive element is delayed by a predetermined phase with respect to that of said second light responsive element when said shaft is driven to rotate in a predetermined direction, the phase delay producing said output representative of said direction.

23. An automatic player comprising:
support means for supporting a disc;
disc drive means for rotating said disc on said support means;
pickup means for performing play operation;
pickup means drive means for shifting said pickup means to a desired address on said disc;
pickup means position detecting means for producing a signal indicative of an address of said pickup means on said disc;
input means for selecting a desired track to be played into the automatic player;
non-recorded section detection means operatively associated with said pickup means, for detecting a non-recorded section formed between two adjacent tracks recorded on said disc;
converting means for calculating an address of said non-recorded section using the signal produced by said pickup means position detecting means and the signal transmitted by said non-recorded section detection means and for producing a non-recorded section address output;
means responsive to the non-recorded section address output and said input means for storing the address of the non-recorded section corresponding to said selected track;
comparing means for comparing said address stored in said storing means with the signal produced by said pickup means position detecting means and providing an output signal upon coincidence thereof; and
control means for activating said pickup means drive means in response to said output signal of said comparing means so that said pickup means is positioned as said address stored in said storing means.

24. An automatic record player comprising:
a turntable for supporting a disc;
turntable drive means for rotating said turntable;
a tonearm;
pickup cartridge means carried by said tonearm;
tonearm drive means for shifting said pickup cartridge means to a desired address on said disc;
pickup cartridge means detecting means for producing a signal indicative of an address of said pickup cartridge means on said disc and for determining the direction of movement of said pickup cartridge means relative to the disc and producing an output representative of said address and direction;
input means for introducing a preselected address to be played into the automatic record player;
storing means for storing said preselected addresses;
comparing means for comparing said preselected address stored in said storing means with the address produced by said pickup cartridge means detecting means and providing an output signal upon coincidence thereof;
control means for activating said tonearm drive means in response to an output signal of said comparing means and the output of said pickup cartridge means so that said pickup cartridge means is positioned at said preselected address;
nonrecorded section detection means for detecting a non-recorded section formed between two adjacent tracks recorded on said disc;
converting means for calculating an address of said non-recorded section using the address produced by said pickup means detecting means and the signal transmitted by said non-recorded section detection means and transmitting said address to said storing means for storage therein; and
further input means for selecting at least one desired track to be played.

25. The automatic record player of claim 24, wherein said non-recorded section detection means is mounted on siad tonearm adjacent to said pickup cartridge means.

* * * * *